UNITED STATES PATENT OFFICE 2,124,297

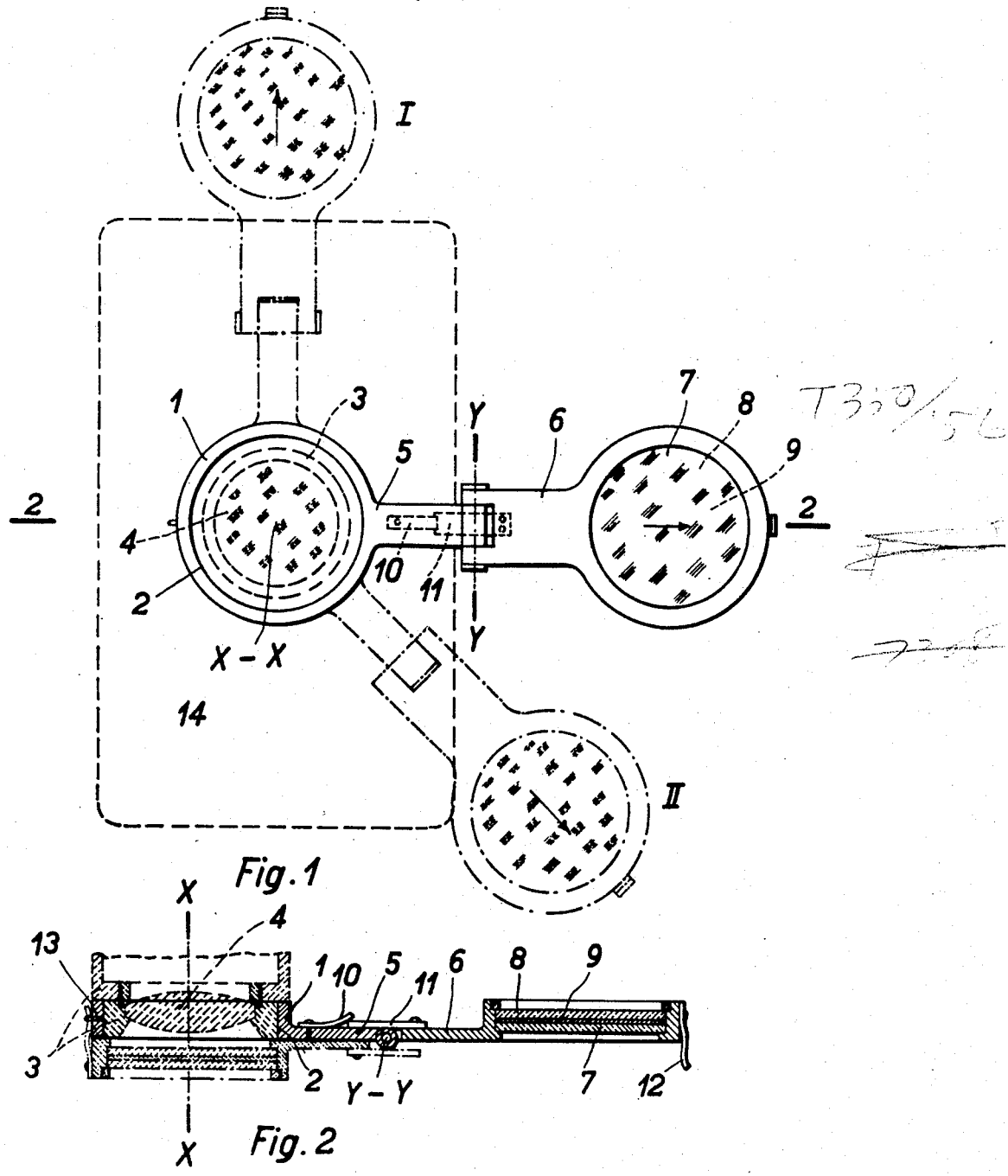

POLARIZATION DEVICE FOR CAMERAS

Carl Herrmann, Jena, Germany, assignor to the firm of Carl Zeiss, Jena, Germany

Application May 12, 1937, Serial No. 142,190
In Germany May 30, 1936

2 Claims. (Cl. 95—64)

The invention concerns a polarization device for cameras which has an adjustable linearly polarizing foil, for instance of herapathite, and which, before an object is photographed, permits to find, by looking through, and thereby adjusting, the foil, that direction of oscillation of the foil in which the influence of the foil on the image presented to the eye is most favorable, and to then place the foil on the object side of the camera objective in such a way that the direction of oscillation of the foil is in coincidence with the direction of oscillation determined in the aforesaid manner.

According to the invention, the polarization device has a cylindric sleeve to be so slipped on the cylindric tube of a camera objective that the axis of this sleeve coincides with, and the sleeve can be rotated about, the axis of the said tube. An arm is attached to the sleeve by means of a hinge the axis of which crosses that of the sleeve at right angles, and a polarizing foil is fixed to the arm in such a manner as to be parallel to the axis of the hinge. By rotating the arm about the axis of the hinge, the foil can be given two positions for use, in both of which the foil is at right angles to the axis of the sleeve, and in the one of which the foil covers the aperture of the sleeve. It is convenient to provide means fixing the arm relatively to the sleeve when the foil assumes the said two positions for use.

In the accompanying drawing, which illustrates the invention, Figure 1 is a view in elevation of a polarizing device, in which the foil is shown in three different finding positions relative to the housing of a camera, and Figure 2 is a section through line 2—2 in Figure 1, the dot-and-dash lines representing the position the foil assumes when a photograph is being taken.

The cylindric interior surface 2 of a sleeve 1 has such a diameter as to allow the sleeve 1 being slipped on the cylindric tube 3 of the objective 4 of a camera in such a manner that the sleeve axis X—X coincides with the axis of the tube 3. Though being rotatable relatively to the tube 3 about the axis X—X, the sleeve 1 fits so tightly on the tube 3 as to remain in any adjusted position. Integral with the sleeve 1 is a part 5 on which an arm 6 is mounted for rotation about an axis Y—Y crossing the axis X—X at right angles. A herapathite foil 9 cemented between two cover glasses 7 and 8 is so fixed to the arm 6 that it is parallel, and its direction of oscillation (indicated by an arrow) at right angles, to the axis Y—Y. By rotating the arm 6 relatively to the sleeve 1 about the axis Y—Y, the foil 9 can be given two positions for use in which it is at right angles to the axis X—X. In the one position for use (the finding position), in which the foil serves for viewing the object to be photographed, the arm 6 is fixed relatively to the sleeve 1 by a spring 10 disposed on the part 5 and acting against a plate 11 on the arm 6. In the other position for use (the photographing position) in which the foil 9 covers the aperture of the sleeve 1, the arm 6 is fixed relatively to the sleeve 1 by a slotted spring 12 into which extends a pin 13 fast with the sleeve 1. The axis Y—Y has such a position relatively to the axis X—X and the foil 9 that, when the foil 9 is being looked through (finding position), the sleeve 1 can be rotated at will relatively to the tube 3 without the housing 14 of the camera obstructing the view through the foil.

When using the polarization device, the sleeve 1 is to be slipped on the tube 3, the foil 9 is to be given its finding position by rotating the arm 6 relatively to the sleeve 1 about the axis Y—Y, and the sleeve 1 is to be rotated relatively to the tube 3 about the axis X—X until that direction of oscillation of the foil 9 has been adjusted in which the foil 9 produces the most favorable effect on the image presented to the eye looking through the foil 9, whereupon the arm 6 is to be rotated relatively to the sleeve 1 about the axis Y—Y through 180°, so that the foil 9 assumes its photographing position on the object side of the objective 4, the previously adjusted direction of oscillation of the foil 9 being maintained.

I claim:

1. A polarization device for a camera, comprising a cylindric sleeve for attachment on and rotation about the lens mount of said camera, an arm, a hinge connecting said arm to said sleeve and allowing relative rotation through 180° about its pivot, the pivotal axis of said hinge being at right angles to the axis of said sleeve, a linearly polarizing foil parallel to said pivotal axis and fixed to said arm with its centre substantially on a line intersecting the axis of said sleeve and at right angles to said pivotal axis, the distance apart of the hinge pivot and the axis of said sleeve being the same as the distance apart of the hinge pivot and the centre of said foil and greater than the clear width of said sleeve.

2. A polarization device according to claim 1, having means for clamping said arm to said sleeve when said foil is at right angles to the axis of said sleeve and faces said sleeve, and means for clamping said arm to said sleeve when said foil is at right angles to the axis of said sleeve and remote from said sleeve.

CARL HERRMANN.